3,444,464
MULTIPLE APERTURE FITTINGS FOR PARTICLE ANALYZING APPARATUS

Wallace H. Coulter, Miami Springs, and Walter R. Hogg, Hialeah, Fla., assignors to Coulter Electronics, Inc., Hialeah, Fla., a corporation of Illinois
Filed Nov. 26, 1965, Ser. No. 509,986
Int. Cl. G01n 27/02, 27/06
U.S. Cl. 324—71                                                17 Claims

ABSTRACT OF THE DISCLOSURE

Multiple aperture apparatus for use with electronic particle study means of the Coulter type, as detailed more fully in the following discussion. The apparatus is characterized by the provision of means for mounting a plurality of microscopic apertures (which also may be termed passageways) to pass therethrough a plurality of independent streams of sample suspension, that is, fluid carrying particles. The disclosed apparatus further includes structure defining a first chamber for a first fluid body which comprises said suspension, and means providing a plurality of second chambers for a second fluid body, each aperture providing a microscopic passageway between the first chamber and one of said second chambers. Electrode means positioned in said chambers for connection with a Coulter type device or the like, such that an electric path may be established through each aperture, with the electrode in the first chamber being common to said paths.

---

This invention relates generally to the field of particle analysis through the use of the Coulter principle and more particularly is concerned with the construction of multiple aperture fittings for use with Coulter apparatus.

In U.S. Patents 2,656,508 and 2,869,078 there are described particle counting and sizing devices which utilize the Coulter principle. According to this principle, a suspension of particles in a fluid is caused to pass through an electric current path of small dimensions. The structure may be a constricted opening in an insulating wall through which an electric current is caused to flow simultaneously with a flow of the particle suspension between bodies of fluid on opposite sides of the wall. The particles are of resistance or impedance different than the fluid, and accordingly each time a particle passes through the opening it varies the impedance of the fluid which is contained in the opening. Electrodes in the bodies of fluid on opposite sides of the wall are connected to detection means which respond to these changes, and accordingly the apparatus is able to detect passage of particles by producing electric pulses, each pulse being of substantially the same duration as the time the particle took in passing through the opening, and each pulse having an amplitude proportional to the size of the particle, without regard to the shape of particle.

Coulter apparatus made and sold throughout the world have for the most part used fittings providing the necessary functions mentioned above in which there is a single constricted path for the electric current and stream of fluid in each apparatus. These may generally be described as follows:

A simple glass beaker serves as the sample container. A glass of substantially smaller diameter, closed at its bottom end and connected into a source of vacuum and a syphon-manometer at its upper end is supported in a position dipping into the beaker. The lower end of the tube has the hole in its side wall which has been referred to above. This hole is usually in the form of a wafer, often of sapphire, drilled with a microscopic orifice, cemented, fused or otherwise set into the wall. The passageway defining the hole has become known as the aperture, and the tube itself is known in the trade as an aperture tube. The aperture tube is disposed in the beaker with the aperture immersed in the sample suspension, so that the said suspension outside of the tube forms one body of fluid on one end of the aperture. The tube itself and all of the fittings which open to its interior are filled with a compatible fluid, or even additional amounts of the suspension itself, so that this interior quantity of fluid forms a second body of fluid on the second end of the aperture. A platinum foil electrode is disposed in the tube in contact with the second body of fluid, and another platinum foil electrode is disposed in the beaker in contact with the first body of fluid. Each electrode has leads extending from the structures. The aperture current source is connected to the electrode leads and likewise electronic detector means including amplifiers are connected to said electrode leads.

The syphon-manometer may be of the type disclosed in the second named patent. There is a mercury column which moves in a metering tube that has one end open to the atmosphere and the other end connected to the interior fluid body of the aperture tube. The mercury column is arranged so that its movement may close contacts installed in the metering tube, the spacing of the contacts representing precise volumes of the metering tube interior traversed by the mercury column. The contacts operate switches to start and stop the detecting equipment and in some devices additionally disable the aperture current source.

In use, the mercury column being at rest, the interior of the aperture tube and its branches being filled with fluid and the aperture being immersed in the sample fluid the counters or other read-out means associated with the detector are at zero. The operator opens the valve to a source of vacuum connected with the interior of the aperture tube and likewise with the interior of the syphon-manometer. This action may also reset the counters to zero. Fluid starts to flow from the beaker through the aperture into the aperture tube, but since this aperture is very small and has a substantial resistance to flow, the mercury column is drawn a substantial distance along its conduit and out of the metering portion thereof, to a condition of unbalance. The counters are still inoperative at this point.

The operator then closes the valve connecting with the vacuum source and the mercury starts to return to a condition of balance, flowing through the metering tube. In doing so it draws the sample fluid through the aperture since the fluid system within the aperture tube is connected only to a conduit leading to the mercury column in addition to the aperture. When the leading end of the mercury column enters the metering section, a "start" electrode at that point is contacted. The mercury column itself has a common connection through another electrode further back in the conduit to a switch that controls the counters. The so-called start electrode is also connected to the switch so that when the column contacts the start electrode the counters are energized and start counting the electric pulses produced by particles passing through the aperture and affecting the detector. At the end of the metering section another electrode, which is called the "stop" electrode, is contacted by the moving mercury column and this turns off the counter. The volume of metering tube traversed by the moving mercury column between electrodes is equal to the volume of sample suspension drawn through the aperture during the time the counters were operating, so that if the volume traversed is known, the count enables determination of the concentration of particles.

Other kinds of fluid moving means may be used, such as variable capacity plungers operated by motors or other mechanical means. Other arrangements for operating the equipment during the sample run may be used.

In some fields of particle study, distribution is more important than concentration, or distribution data is needed in addition to concentration, and various apparatus have been devised for obtaining such information. Distribution information may be obtained by taking a fluid sample from a conduit which carries continuously flowing fluid. This merely requires that the apparatus operate for a sufficient time to give a good statistical sample, and through the use of threshold circuits, the electrical pulses may be electronically divided into channels each representing a range of different sizes. The numbers of particles in each range provide the desired information from which the characteristic integral and differential curves of particulate material may be computed.

Many problems have been inherent in apparatus used thus far in which a sample run is made using only a single aperture, whether in studies of concentration or size distribution. Additionally, considerable information not attainable through the use of only a single aperture in a sample run has not been available in the art.

Accordingly, the multiple aperture apparatus of the present invention was designed for use in Coulter type apparatus which employs a method of particle analysis whereby most of the disadvantages of the single aperture Coulter device have been obviated by the use of a plurality of apertures, drawing the sample suspension through all of them from the same body of fluid, either consecutively, simultaneously, overlapping in time or in consecutive groups. The aforementioned Coulter type apparatus, and correspondingly the associated method, form the basis for an application to be filed subsequently, which will be co-pending with the instant application. The multiple aperture apparatus provides increased accuracy, reliability, and more statistical information. The said Coulter type multiple aperture apparatus is designed for use in concentration studies primarily, where the apertures are all of the same size, and in distribution studies wherein the apertures are of graduated sizes. These two areas of study, of course, are not mutually exclusive, and such apparatus could be adapted for either or both.

The primary object of this invention is to provide fittings for use in such multiple aperture apparatus.

Other objects of the invention are to provide multiple aperture fittings for use with static as well as on-stream of flowing samples; fittings which are economical of the sample fluid; fittings which are economical to manufacture, install and use; fittings which are simple in construction and operation; fittings which provide the necessary electrical terminals without danger of electrical or fluid leakage; fittings which are adaptable to a diverse variety of apparatus.

The principles described herein may be applied to many different forms of structure taught in said Patent 2,656,-508 using a variety of electrode and flow arrangements. The achievement of the advantages resulting from such application of principles comprises another important object of the invention.

With these objects and others in view which will become more apparent to those skilled in this art as a description of the invention proceeds, there have been described hereinafter preferred embodiments of the invention, from a study of which, in connection with drawings illustrating the same, one may fully understand and comprehend the invention in all of its aspects.

The apparatus disclosed herein is characterized by the provision of means for mounting a plurality of apertures (which may be defined as passageways herein) to pass therethrough a plurality of independent streams of sample suspension, that is, fluid carrying particles, means providing a common body of sample suspension at one end of each aperture, means providing an independent body of fluid at the second end of each aperture in certain types of electrode arrangements, means for moving the fluid through all apertures consecutively, simultaneously, or in consecutive groups, electrode means in the common body serving as one electrical terminal for all apertures, each aperture having an independent electrode in its own independent stream of fluid, or at least in position to be immersed in the fluid when present. The apparatus contemplates arrangements in which the common body of fluid is either static or flowing; in which various control means, filling and flushing means, support means, and the like are provided; and resides in the general structure as well as certain important details. In another aspect, the invention is not limited to structures in which there is required an independent body of fluid at the second end of each aperture. The basic concept is the establishment of a plurality of fluid streams for independent measurement.

Figures 1, 2:
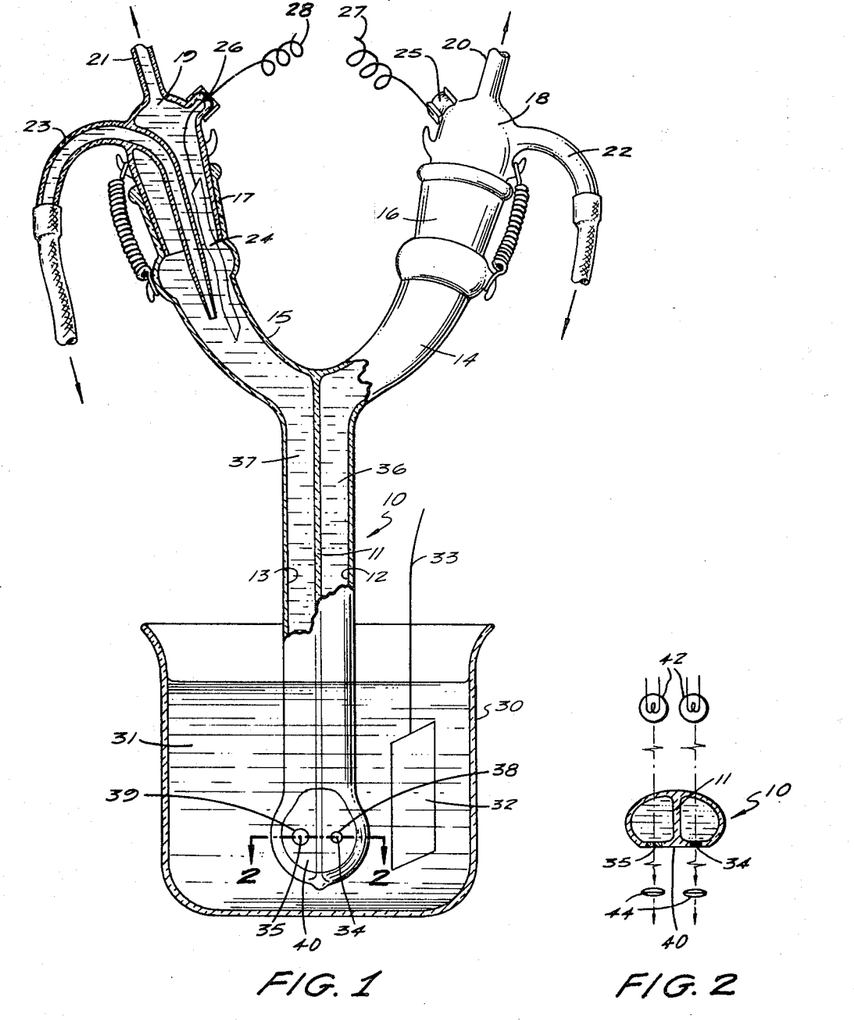
FIG. 1 is a somewhat diagrammatic sectional view, with parts shown in elevation, of a structure which may be termed a dual aperture tube and associated fittings constructed in accordance with the invention and having two apertures.
FIG. 2 is a sectional view taken through the tube of FIG. 1 and in the indicated direction along the line 2—2, also showing diagrammatically a portion of two optical systems for viewing the apertures.

In FIG. 1 there is illustrated an arrangement in which only two apertures are provided. A dual aperture tube 10 is constructed of glass or other insulating material having a central partition 11 dividing the interior of the tube into two chambers 12 and 13. The upper end of the tube 10 is bifurcated to form two integral divergent branches 14 and 15 each terminating in a ground throat or seat as shown at 16 and 17 within which are fitted suitable conforming stoppers 18 and 19. Each stopper is hollow and comprises a glass fitting provided with several outlets. There are vacuum outlets as at 20 and 21 and auxiliary outlets at 22 and 23. Each branch has a foil electrode therein, the one in the left branch 17 being shown at 24 and the electrodes are connected to terminals indicated at 25 and 26 respectively. Electrical leads 27 and 28 are adapted respectively to be clipped to the terminals, these leads extending to aperture current sources and detectors (not shown). The bottom end of the tube 10 is closed off as shown and designed to rest or be disposed in a vessel 30 which is filled with a sample fluid 31. There is also an electrode 32 in the body of fluid 31 with a connecting lead 33. An electric current will flow between the common electrode 32 and each of the electrodes in the branches by way of the fluid 31 through the apertures 34 and 35 and the downstream bodies of fluid 36 and 37 respectively in each chamber.

The apertures 34 and 35 are usually formed in sapphire or glass wafers 38 and 39, respectively, fused, cemented or otherwise set into the flattened face 40 of the tube bottom. Each aperture communicates with only one chamber. The wafers are fabricated independently of the tube 10. Under certain circumstances where electrodes are located within the apertures, the apertures need not communicate with independent fluid bodies.

As shown in the illustrations, the wafer 38 is smaller than the wafer 39 indicating that the aperture 34 is smaller than the aperture 35. In certain studies these may be the same size.

The apertures 34 and 35 are substantially parallel in this structure so that if desired they may be illuminated from the rear of the tube, as by one or more lamps 42 and viewed through a microscope or projected on a screen. The optical trains of such devices are diagrammatically indicated at 44.

In use, the outlets 22 and 23 may be used to fill the chambers 12 and 13 and the entire interior of the structure with fluid, preferably devoid of any air bubbles. Thereafter, the vacuum may be applied to draw the sample fluid 31 through the apertures 34 and 35. The aperture current for the aperture 34 is established between the electrode 32 and the electrode in the upper branch 14. The aperture current for the aperture 35 is established between the electrode 32 and the electrode 24. This same arrangement is used to apply signals from the respective apertures to independent detectors (not shown). Reference made herein to independent external electrical apparatus is intended to mean such detectors even if all or some are contained in the same housing or have certain common components, such as power supplies or the like. Metering may be done by means connected with the fittings 18 and 19 as described in Patent 2,869,078, instead of by controlling the vacuum. A manometer-syphon may be connected to the outlets 22 and 23, if desired. In fact, any timing or metering means may be used to obtain a measure of the sample fluid passed through each aperture.

Similar tubes may be constructed using more than two chambers. Likewise, for any given study, more than one dual tube may be used, immersed in a common sample container.

In accordance with the disclosure of the co-pending application the use of multiple apertures in a single sample run renders the entire apparatus more reliable than single aperture devices. The principal reason for this is that errors and delays caused by clogging, which is one of the worst problems in particle study, to a large extent may be reduced or even eliminated. Those structures in the past which have used microscopes or projection systems to enable surveillance of the aperture were single aperture devices. In a multiple aperture device it will not be necessary in most cases to be able to see the aperture to make a decision regarding validity of data. Accordingly, the axes of the apertures need not be parallel to one another but may be oriented in any suitable geometric manner convenient for the manufacture of the tube. Parallel axes are required to enable optical viewing because of illuminating and because of the need for a straight and unobstructed line to the optical system.

While it may be observed that where two apertures only are used, a discrepancy between the data of each would be usually cause for data rejection, nevertheless such discrepancy is in the nature of an alarm that there is an abnormality. It is still advantageous, therefore, to use even two apertures. Such alarm can be used automatically to reject data or cancel a run. If more than two apertures are used, agreement between any two justifies continuation of the run, making possible automated or unattended operation.

Figure 3:
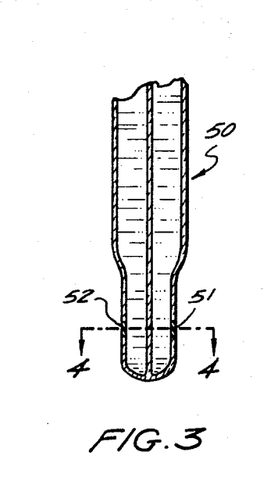
FIG. 3 is a fragmentary sectional view through another form of dual aperture tube.
Figure 4:
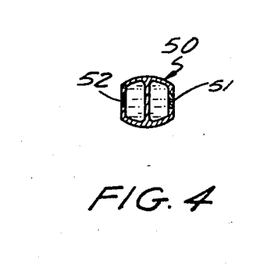
FIG. 4 is a sectional view through the tube of FIG. 3 taken along the line 4—4 and in the indicated direction.

In FIG. 3 there is illustrated a simple dual aperture tube 50 constructed in a manner very similar to the tube 10, except that in this case the apertures 51 and 52 are co-axial. In all other respects the tubes are similar.

Figure 5:
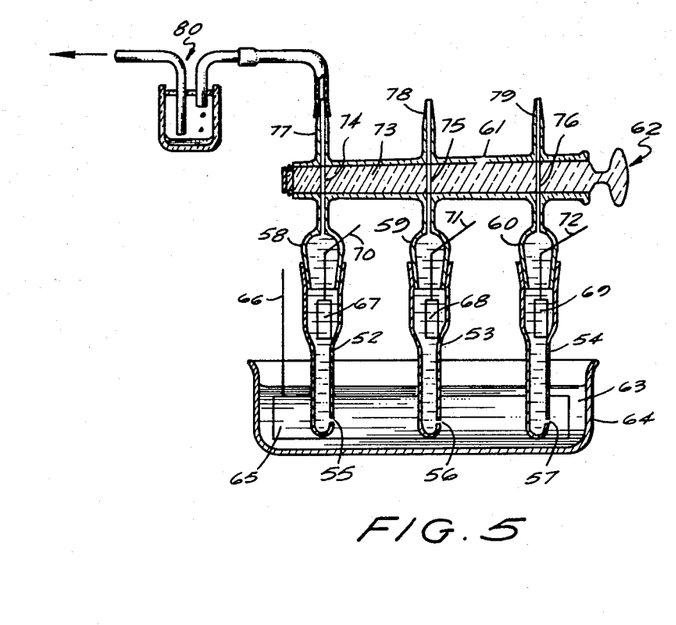
FIG. 5 is a somewhat diagrammatic sectional view through an arrangement which utilizes three conventional aperture tubes with suitable fittings and means to operate all simultaneously.

In FIG. 5 there is illustrated a simple arrangement for using a plurality of conventional aperture tubes for a multiple aperture apparatus. Tubes 52, 53 and 54 of conventional Coulter construction, each having an aperture at 55, 56 and 57 respectively, are mounted to the fittings 58, 59 and 60 of the barrel 61 of a stopcock 62. The lower ends of each tube are immersed in the fluid 63 in a vessel 64, with the apertures below the surface. The common electrode 65 connects the common lead 66, and each aperture tube has its own interior electrode at 67, 68 and 79 connected to respective leads 70, 71 and 72. The rotary plug 73 of the stopcock 62 has transverse passages 74, 75 and 76 which may be aligned with each fitting 58, 59 and 60 and its respective outlet nipple 77, 78 and 79. Operation of this apparatus is believed obvious. For the electrode system shown here, care should be taken to insulate the individual circuits from one another to minimize leakage between apertures. There may be scavenge jars such as shown at 80 in each of the outlet lines for breaking up the streams of fluid, and the stopcock 62 may be made in insulated linked sections. Preferably the detectors for the respective circuits have low impedance inputs to decrease the tendency for signal leakage between the various aperture electrodes.

Figure 6:
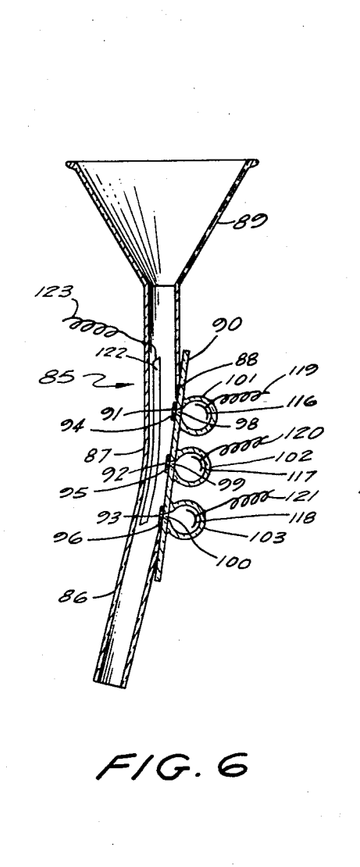
FIG. 6 is a fragmentary sectional view through a flow-through arrangement utilizing three apertures.
Figures 7, 8, 9:
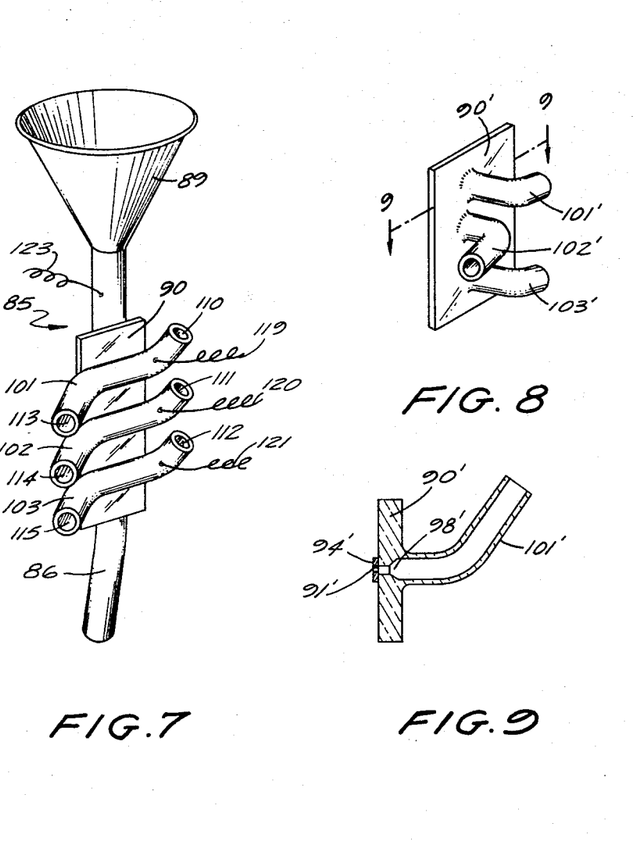
FIG. 7 is a side elevational view of the same.
FIG. 8 is a perspective view of a form of cover plate for use with an apparatus of the type shown in FIGS. 6 and 7.
FIG. 9 is a sectional view through the same.

Referring now to FIGS. 6 and 7, the structure there illustrated identified by the reference character 85 comprises a pipe or conduit 86 which is made with a bend at 87 so that one may grind off the convex side of the bend and produce a flat seat as indicated at 88 which will be generally oval and elongate in configuration. At its upper end conduit 86 is shown with a funnel 89 through which a suspension of particles in a fluid may be introduced. In place of the funnel, the conduit 86 may either be a by-pass from a continuously flowing body of fluid or it may be the pipe carrying the entire flow.

Upon the seat 88, there is engaged a cover plate 90 of glass or other suitable material having apertures 91, 92 and 93 mounted thereon preferably on the interior surface which is exposed to the interior of the conduit 86. Such apertures are formed in wafers 94, 95 and 96 respectively, which are cemented, fused or otherwise engaged to the cover plate 90. As shown, a conical recess is formed in the cover plate immediately behind each of the wafers as shown at 98, 99 and 100. The cover plate 90 may be either fused or cemented or even clamped to the seat 88.

On its exterior the cover plate 90 will have independent tubes, conduits or vessels mounted thereon, each conduit being over a conical recess. Thus there are shown three sections of tubing at 101, 102 and 103 engaged to the outer surface of the cover plate 90, thereby providing an independent outlet for the respective apertures 91, 92 and 93. In FIG. 8 a cover plate 90' is illustrated having tubes 101', 102' and 103' all mounted thereon, these latter tubes being sections whose entrance is co-axial with the apertures, as shown especially in FIG. 9. In use it is intended that fluid will flow through the apertures and into the receiving conduits, but it should be noted that such conduits are required to be at least partially filled with fluid in order to provide the necessary path for the conduction of the aperture current as well as to form a portion of the input circuit to the detectors.

In the structure 85 of FIGS. 6 and 7, each of the conduits 101, 102 and 103 has both inlet and outlet, the inlets being shown at 110, 111 and 112 while the outlets are at 113, 114 and 115. Preferably, the inlets are at a higher level than the outlets so that the fluid will have a tendency of flowing downwardly. The inlet may be connected to some source of fluid so that they may be filled before use and then sealed by a stopcock or the like (not shown).

Each conduit, 101, 102 and 103, has an interior electrode as shown at 116, 117 and 118 with its connecting lead 119, 120 and 121, respectively. A common electrode 122 is disposed in the conduit 86, it connects to a common lead 123 as shown. The conduits 101, 102 and 103 may be cemented, fused or even clamped to the surface of the cover plate 90. If all of the elements of the structure 85 are held together by clamps, elastic bands or the like, it renders the apparatus easier to disassemble and clean.

In FIGS. 6, 7, 8 and 9, it will be appreciated that the structures are shown in many instances with exaggerated dimensions. The conduit may be capillary tubing and the thickness of the cover plate may be a few hundredths of an inch. Likewise the apertures are so small that it is unlikely they could be seen with the naked eye in illustrations at this scale.

Figure 10:
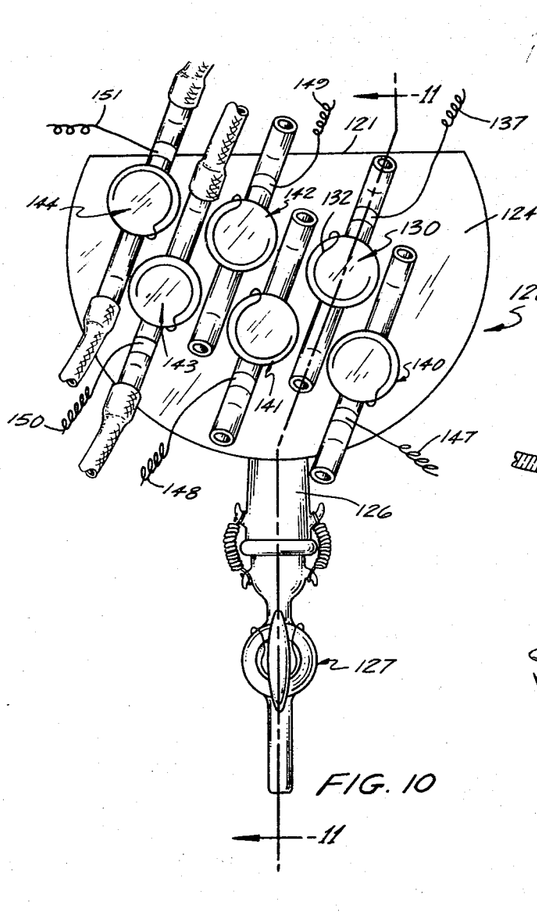
FIG. 10 is a front-elevational view of a sampling apparatus using six apertures.
Figures 11, 12:
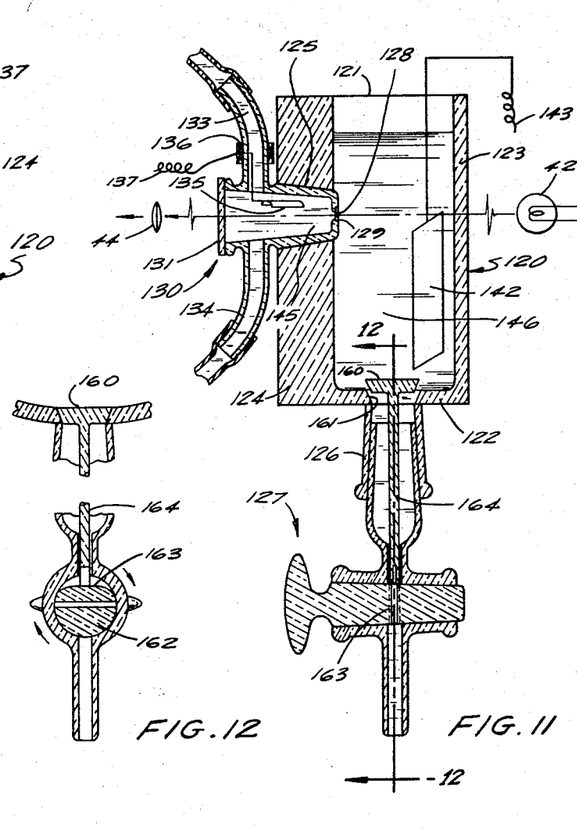
FIG. 11 is a sectional view through the same.
FIG. 12 is a fragmentary sectional view along the line 12—12 of FIG. 11 and in the direction indicated.

FIGS. 10 and 11 illustrate a practical example of a structure which utilizes fixed apertures with fixed independent current sources, detectors and connecting fluid driving means. The apparatus is resignated generally 120 and is shown as apparatus for use with a static sample, but it should be understood that it is capable of being used with a flow-through or on-stream sample. There is a vessel 121 which has a generally circular side wall 122 with a rear wall 123 and a relatively thick front wall 124. The vessel may be made of insulating material, and the purpose for making the front wall relatively thick is so that conical sockets may be accurately formed therein, as by grinding. Such a socket is shown at 125. A female fitting 126 is mounted to the side wall 122 in the bottom thereof for drainage, there being a suitable stopcock 127 engaged therein for obvious purposes.

As stated above, there are six apertures in connection with this apparatus, only one of which is seen in FIG. 11. This aperture is designated 128, and it is formed in a wafer 129 set into the bottom wall of a hollow, generally frusto-conical fitting 130 that includes an outer cover glass 131 held in place by spring 132, an upper integral inlet conduit 133 and a lower outlet conduit 134. On its interior there is a foil electrode 135 electrically connected to a terminal band 136 to which there is electrically engaged lead 137.

As shown in FIG. 10, this structure described in connection with the fitting 130 is duplicated in each of the other fittings 140, 141, 142, 143 and 144. The purpose of the inlet conduit equivalent to the conduit 133 shown in FIG. 11 is to enable fluid to be introduced into the interior chamber of each of the fittings. This chamber is designated 145 in the fitting 130, and it is in contact with the electrode 135. Likewise all of the chambers have this same arrangement.

The purpose of the outlet conduit 134 and its equivalent in each of the other fittings is to establish and permit continuous flow of the fluid. Accordingly, the large body 6 of fluid 146 will be feeding six independent streams. Each fitting has its own electrode equivalent to the electrode 135 and its own "hot" electrical lead. These are designated 147, 137, 148, 149, 150 and 151. The common electrode 152 in the vessel 121 has an electrical lead 143 common to all circuits.

The construction using the disc-like cover glasses, as shown in 131, enables the inner chambers to be cleaned and enables the ready installation, repair, etc. of the electrode system.

Apparatus which utilizes more than three or four apertures would most likely be used in distribution studies so that the aperture sizes would be different. In such an arrangement it would be preferable that some advantage be taken of the tendency of the larger particles to settle. Statistically, this would not to any great extent change the nature of the distribution data if settlement were not permitted to take place over a substantial period of time. Accordingly, it would be preferred that the aperture of the fitting 144 be the smallest and the aperture of the fitting 140 be the largest with the intermediate graduated. The order of increasing size would be in accordance with the level of the aperture and would be 144, 142, 130, 143, 141, 140.

A large drain at the bottom of the vessel could drop large and heavy particles into the fitting 126. Conveniently a poppet-valve 160 is seated in the seat 161 formed in the vessel when the stockcock is closed (FIG. 12). The plug 162 has a groove 163 which cooperates with the valve stem 164 to permit the valve 160 to drop into seated condition when the stopcock is closed. When the plug 162 is rotated to open condition the valve is raised.

Means may be provided to illuminate and view each of the apertures of the device 120, as shown in FIG. 11.

From the above description, it will be obvious that the fittings of the invention are capable of rather wide and varied construction.

What it is desired to secure by Letters Patent of the United States is:

1. Apparatus for use with an electronic particle study device or the like, of the type wherein a suspension of particles is analyzed by passage of said suspension from a first fluid body to a second fluid body through a microscopic passageway defined in a wall which separates one of said fluid bodies from the other and at least one of said fluid bodies comprising said suspension, said passage being caused by differential pressure between said fluid bodies, the respective fluid bodies being insulated electrically one from the other except through said microscopic passageway, said device further including circuit means for establishing an electric path through said microscopic passageway whereby discrete signals may be generated by the passage of at least individual particles therethrough, the said apparatus comprising:
   (a) a first vessel adapted to contain said first body of fluid with the particles suspended therein.
   (b) a plurality of second vessels each adapted to contain a body of fluid therein to define a plurality of second fluid bodies, and each of said second vessels having,
      (i) a wall portion thereof adapted to contact the body of fluid of said first vessel on the exterior of said wall portion,
      (ii) a microscopic aperture in said wall portion defining said microscopic passageway where so contacted to provide for flow of the particles in suspension from said first vessel into said second vessel only through the respective aperture, and
      (iii) an electrode contacting the fluid in said second vessel and having an electric conductor extending to the exterior of said second vessel to provide an electric terminal of said circuit means for connection to said electronic particle study device,
   (c) an electrode in said first vessel providing a portion of said circuit means and having an electric conductor extending to the exterior thereof to provide a common electric terminal for connection to said electronic particle study device, which common terminal defines a portion of the electric path through each of said microscopic apertures, and
   (d) the interiors of all of said second vessels being insulated one from the other except by way of their respective apertures whereby independent trains of signals may be generated by the passage of particles through the respective apertures.

2. Apparatus as defined in claim 1, further including means for creating said pressure differential between the first fluid body and each of said second fluid bodies, to cause the fluid body in the first vessel which includes said suspension of particles to move through the respective apertures and into each of said second vessels.

3. Apparatus as defined in claim 2 wherein said means for creating said pressure differential includes independent means associated with each of said second vessels.

4. Apparatus as defined in claim 1 wherein said second vessels are defined by a multi-chamber structure in which there are common partitions forming said chambers, each chamber having an exterior wall, said chambers comprising said second vessels and the exterior wall comprising said wall portion of each of said second vessels.

5. Apparatus as defined in claim 4 in which there are two chambers, and the exterior walls of said chambers lie in the same plane whereby said microscopic apertures are parallel.

6. An apparatus tube for use with an electronic particle study device or the like, of the type wherein a suspension of particles is analyzed by passage of said suspension from a first fluid body to a second fluid body through a microscopic passageway defined in a wall which separates one of said fluid bodies from the other and at least one of said fluid bodies comprising said suspension, said passage being caused by differential pressure between said fluid bodies, the respective fluid bodies being insulated electrically one from the other except through said microscopic passageway, said device further including circuit means for establishing an electric path through said microscopic passageway whereby discrete signals may be generated by the passage of at least individual particles therethrough, said aperture tube comprises: an elongate glass structure adapted to be immersed in a vessel containing said first fluid body, said elongate structure having lower and upper portions, the upper portion being branched to define separate fluid conduits, each having an electrode positioned therein which is connectible to said electronic particle study device, means partitioning the lower portion of said elongate structure to form a plurality of chambers and each chambers communicating with one of said branches and adapted to contain therein a second fluid body, a plurality of microscopic apertures in said lower portion providing the microscopic passageway between each second fluid body chamber and the exterior of said elongate structure adapted to contact said first fluid body, and the respective branches adapted to be connected to means for creating said pressure differential between the respective fluid bodies, whereby independent trains of signals may be generated by said particle study device upon the passage of particles suspended in the first fluid body through the respective microscopic apertures associated with each second fluid body chamber.

7. An aperture tube as defined in claim 6 wherein there are two chambers, and the microscopic apertures formed therein are parallel.

8. Apparatus for use with an electronic particle study device or the like, of the type wherein a suspension of particles is analyzed by passage of said suspension from a first fluid body to a second fluid body through a microscopic passageway defined in a wall which separates one of said fluid bodies from the other and at least one of said fluid bodies comprising said suspension, said passage being caused by differential pressure between said fluid bodies, the respective fluid bodies being insulated electrically one from the other except through said microscopic passageway, said device further including circuit means for establishing an electric path through said microscopic passageway whereby discrete signals may be generated by the passage of at least individual particles therethrough said apparatus comprising a conduit of insulating material defining a chamber adapted to contain said first fluid body with the particles suspended therein, a plurality of vessels connected with said conduit and defining chambers adapted each to contain a second fluid body, a plurality of microscopic apertures formed in said conduit, each aperture being associated with but one of said vessels and providing a microscopic passageway between the first fluid body chamber defined by said conduit and the respective second fluid body chamber defined by said vessels.

9. Apparatus as defined in claim 8 wherein said conduit includes a side opening and a plate engaged over said opening, the said plurality of vessels being connected to said plate and said microscopic apertures being formed in said plate.

10. Apparatus as defined in claim 8 wherein there is an electrode in each vessel and in said conduit, said electrodes adapted to define portions of said circuit means, with the electrode in said conduit being common to electrical paths adapted to be established through the respective apertures.

11. Apparatus for use with an electronic particle study device or the like, of the type wherein a suspension of particles is analyzed by passage of said suspension from a first fluid body to a second fluid body through a microscopic passageway defined in a wall which separates one of said fluid bodies from the other and at least one of said fluid bodies comprising said suspension, said passage being caused by differential pressure between said fluid bodies, the respective fluid bodies being insulated electrically one from the other except through said microscopic passageway, said device further including circuit means for establishing an electric path through said microscopic passageway whereby discrete signals may be generated by the passage of at least individual particles therethrough, said apparatus comprising:
(a) a first vessel defining a chamber for carrying a quantity of said first fluid body with the particles in suspension therein, said first vessel having a plurality of sockets formed in at least one wall portion, and
(b) a plurality of second vessels, one being disposed in each socket, thereby defining a plurality of chambers each of which is adapted to contain a second fluid body,
(c) each second vessel having an end wall in position to be immersed in a first body of fluid in said first vessel,
(d) a microscopic aperture formed in each end wall, said apertures providing microscopic passageways which connect the fluid body chamber of the first vessel with each of the fluid body chambers of the second vessels, and
(e) electrode means in each second vessel and said first vessel, said electrodes defining a portion of said circuit means with the electrode in said first vessel providing a common electrical terminal for an electric path adapted to be established through each aperture.

12. Apparatus as defined in claim 11 further including conduit means connected with each second vessel independently of the other of said second vessels and adapted to be connected to means capable of creating said pressure differential for causing passage of the particles through said passageways.

13. Apparatus as defined in claim 11 in which the microscopic apertures are of varying sizes from smallest to largest in descending order of fluid level.

14. Apparatus as defined in claim 11 in which each second vessel has a second end wall removable from the vessel to give access to the interior thereof.

15. Apparatus as defined in claim 11 in which there is a drain in the bottom of the first vessel and means for plugging the drain during use of the apparatus.

16. Apparatus for use with an electronic particle study device or the like, of the type wherein a suspension of particles is analyzed by passage of said suspension from a first fluid body to a second fluid body through a microscopic passageway defined in a wall which separates one of said fluid bodies from the other end at least one of said fluid bodies comprising said suspension, said passage being caused by differential pressure between said fluid bodies, the respective fluid bodies being insulated electrically one from the other except through said microscopic passageway, said device further including circuit means for establishing an electric path through said microscopic passageway whereby discrete signals may be generated by the passage of at least individual particles therethrough, said apparatus comprising:
(a) a conduit member adapted to be immersed in a first body of fluid with said particles suspended therein, said condiut member including a plurality of chambers, each adapted to contain a second fluid body with the outer wall of said conduit adapted to separate the first fluid body from each of said second fluid bodies,
(b) a plurality of microscopic apertures formed in said wall, each aperture being associated with one of said chambers, and providing microscopic passageways permitting passage of said first fluid body and the suspended particles into each chamber,
(c) an electrode positioned in each chamber contained contact with a second fluid body contained therein and adapted to be coupled to said electronic particle study device, such that each electrode provides a portion of an electric path adapted to be established through its associated aperture, whereby upon use of said apparatus with said electronic particle study device a plurality of independent discrete trains of signals may be generated by the passage of particles through said microcopic apertures.

17. In combination, multiple aperture apparatus and an electronic particle study device, said device being of the type wherein a suspension of particles is analyzed by passage of said suspension through a microscopic passageway, and including circuit means for establishing an electric path through said microscopic passageway whereby discrete signals are generated by the passage of at least individual particles therethrough, and said multiple aperture apparatus comprising:
(a) a first vessel adapted to contain a first body of fluid with the particles suspended therein;
(b) a plurality of second vessels each adapted to contain a second body of fluid therein, each second vessel having,
 (i) a wall portion adapted to contact a body of fluid in said first vessel on the exterior of said wall portion,
 (ii) a microscopic aperture in said wall portion defining a microscopic passageway between the interior of the second vessel and the exterior of the wall portion, and
 (iii) an electrode in said second vessel and having an electric conductor extending to the exterior of said second vessel to provide an electric terminal of said circuit means for the electronic particle study device;
(c) an electrode in said first vessel having an electric conductor extending to the exterior thereof to provide an electric terminal for connection to said electronic particle study device, said terminal being common to the electrical path which is established through each microscopic aperture, and
(d) the interiors of all of said second vessels being insulated one from the other except by way of their respective apertures, whereby a plurality of independent trains of signals may be generated by the passage of particles through the respective apertures.

References Cited

UNITED STATES PATENTS

| 1,603,698 | 10/1926 | Kramer | 137—263 XR |
| 1,911,351 | 5/1933 | Cole | 73—195 XR |
| 2,830,945 | 4/1958 | Keidel | 324—30 |
| 3,060,374 | 10/1962 | Strain | 324—30 XR |
| 3,258,685 | 6/1966 | Horton | 324—34 |
| 3,299,354 | 1/1967 | Hogg | 324—71 |
| 3,364,742 | 1/1968 | De Leo | 73—212 |

OTHER REFERENCES

Petit, "Thermodynamics of Molten Antimony Sulfide," The Journal of Physical Chemistry, vol. 68, No. 1, January 1964, pp. 9–13.

RUDOLPH V. ROLINEC, Primary Examiner.

E. E. KUBASIEWICZ, Assistant Examiner.

U.S. Cl. X.R.

137—263

UNITED STATES PATENT OFFICE
CERTIFICATE OF CORRECTION

Patent No. 3,444,464                                                          May 13, 1969

Wallace H. Coulter et al.

It is certified that error appears in the above identified patent and that said Letters Patent are hereby corrected as shown below:

Column 7, line 17, "resignated" should read -- designated --. Column 9, line 31, "chambers", second occurrence, should read -- chamber --. Column 10, line 63, "end" should read -- and --. Column 11, line 10, "contained" should read -- for electrical --.

Signed and sealed this 17th day of March 1970.

(SEAL)
Attest:

Edward M. Fletcher, Jr.                                   WILLIAM E. SCHUYLER, JR.
Attesting Officer                                                        Commissioner of Patents